United States Patent
Satou

(10) Patent No.: US 6,623,020 B1
(45) Date of Patent: Sep. 23, 2003

(54) VEHICLE SUSPENSION MEMBER ASSEMBLY

(75) Inventor: Masaharu Satou, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 53 days.

(21) Appl. No.: 09/589,128

(22) Filed: Jun. 8, 2000

(30) Foreign Application Priority Data

Jun. 11, 1999 (JP) .......................................... 11-165929

(51) Int. Cl.⁷ .............................................. B62D 21/11
(52) U.S. Cl. ............................... 280/124.109; 280/788; 180/378
(58) Field of Search ........................ 280/124.109, 788; 180/378, 312; B62D 21/11

(56) References Cited

U.S. PATENT DOCUMENTS

| 5,556,133 A | * | 9/1996 | Oku et al. | 280/781 |
| 5,560,651 A | * | 10/1996 | Kami et al. | 280/788 |
| 5,562,308 A | * | 10/1996 | Kamei et al. | 280/788 |
| 5,641,180 A | * | 6/1997 | Kamei et al. | 280/781 |
| 6,120,060 A | * | 9/2000 | Kocer et al. | 290/788 |

FOREIGN PATENT DOCUMENTS

| EP | 1035003 A2 | * | 9/2000 | B62D/21/11 |
| JP | 06008846 A | * | 6/1994 | B62D/21/02 |

* cited by examiner

*Primary Examiner*—Kenneth R. Rice
*Assistant Examiner*—Christopher Buchanan
(74) *Attorney, Agent, or Firm*—Foley & Lardner

(57) ABSTRACT

Provided is a vehicle suspension member assembly suitable for a multi-link type rear suspension system. The suspension member assembly includes a pair of front and rear cross members and a pair of side members which are joined to constitute a generally rectangular suspension member subassembly. A pair of rear resilient supports are disposed at the opposite longitudinal end portions of the rear cross member. A pair of front resilient supports are disposed at the front end portions of the side members. The rear ends of the side members are attached to the front surface of the rear cross member. The front cross member is disposed between the side members and have opposite longitudinal ends attached to the inner side surfaces of the side members. To the rear cross members are provided a pair of brackets by means of which a rear connecting portion of a lower link is attached to the suspension member assembly.

12 Claims, 4 Drawing Sheets

VEHICLE SUSPENSION MEMBER ASSEMBLY

BACKGROUND OF THE INVENTION

The present invention relates to suspension systems for automotive vehicles and particularly to a vehicle suspension member assembly suitable for a multi-link type rear suspension system.

A vehicle rear suspension member assembly consists of, as shown in FIG. 4, a pair of left and right side members 50 and 50 spaced from each other laterally of a vehicle body, and a pair of front and rear cross members 51 and 52 spaced from each other longitudinally of the vehicle body. Each of the cross members 51 and 52 is attached at opposite longitudinal ends to the side members 50 and 50, whereby to constitute a generally rectangular framework. Each side member 50 has at the front and rear ends thereof resilient supports 53 and 54. The suspension member assembly is resiliently supported on the vehicle body by way of the resilient supports 53 and 54.

Each side member 50 is provided with a pair of front and rear lower link connecting brackets 55 for connecting thereto front and rear connecting portions of a lower link, respectively. On the front and rear cross members 51 and 52 is supported a differential gear (not shown) by way of resilient bushings 56. Each side member 50 is further provided with a pair of upper link connecting brackets 57 for connecting thereto upper links, respectively.

SUMMARY OF THE INVENTION

For reduction of the cost, common use of parts is required. However, in case the resilient support points P2 for supporting the front portion of the above described suspension member assembly on the vehicle body are varied or modified to cope with a variation of the tread of the vehicle due to a variation of a kind of vehicle, without changing the resilient support points P1 for supporting the front portion of the suspension member assembly on the vehicle body, it is required to change or modify all of the above described four parts 50, 51 and 52 and therefore it is impossible to make common use of those parts in vehicles having different treads.

In order that the front resilient support points P2 can be moved laterally outward of the vehicle body without changing or modifying the side members 50 and 50, while holding the rear resilient support points P1 unchanged or fixed, each side member 50 must be turned laterally outward of the vehicle body about the rear resilient support point P1, thus causing variations in the angles of inclination of the links to be connected to the side members 50. Accordingly, common use of the links makes it difficult to attain common use of the side member 50.

Since the differential gear is supported on the front and rear cross members 51 and 52 which are in turn supported on the m vehicle body by way of the side members 50, a large shearing force is applied to the connecting portions or joints (welded portions) between the cross members 51 and 52 and the side members 50 and 50, particularly to the connecting portion or joints between the rear side cross member 52 and the side member 50, due to a force supplied thereto from the differential gear (i.e., so-called windup input), thus requiring a countermeasure for enabling the suspension member assembly to retain a sufficient strength and rigidity.

It is accordingly an object of the present invention to provide a vehicle suspension member assembly which enables to make common use of parts in vehicles having different treads.

It is a further object of the present invention to provide a vehicle suspension member assembly of the foregoing character which has a sufficient strength and rigidity.

To accomplish the above objects, there is provided according to an aspect of the present invention a novel and improved vehicle suspension member assembly comprising a pair of front and rear cross members spaced from each other longitudinally of a vehicle body and elongated laterally of the vehicle body, a pair of side members spaced from each other laterally of the vehicle body and elongated longitudinally of the vehicle body, the side members and the front and rear cross members being joined to constitute a generally rectangular suspension member subassembly, a pair of front resilient supports for supporting a front portion of the subassembly on the vehicle body, and a pair of rear resilient supports for supporting a rear portion of the subassembly on the vehicle body, wherein the rear resilient supports are disposed at opposite longitudinal end portions of the rear cross member, respectively, and the front resilient supports are disposed at front end portions of the side members, respectively, and wherein the front cross member is disposed between the side members.

According to a further aspect of the present invention, there is provided a novel and improved vehicle suspension member assembly comprising a pair of front and rear cross members spaced from each other longitudinally of a vehicle body and elongated laterally of the vehicle body, a pair of side members spaced from each other laterally of the vehicle body and elongated longitudinally of the vehicle body, the side members and the front and rear cross members being joined to constitute a generally rectangular suspension member subassembly, a pair of front resilient supports for supporting a front portion of the subassembly on the vehicle body, and a pair of rear resilient supports for supporting a rear portion of the subassembly on the vehicle body, wherein the front resilient supports are disposed at opposite longitudinal end portions of the front cross member, end portions of the side members, respectively, and wherein the rear cross member is disposed between the side members.

DESCRIPTION OF THE PREFERRED EMBODIMENTS

Figure 1:
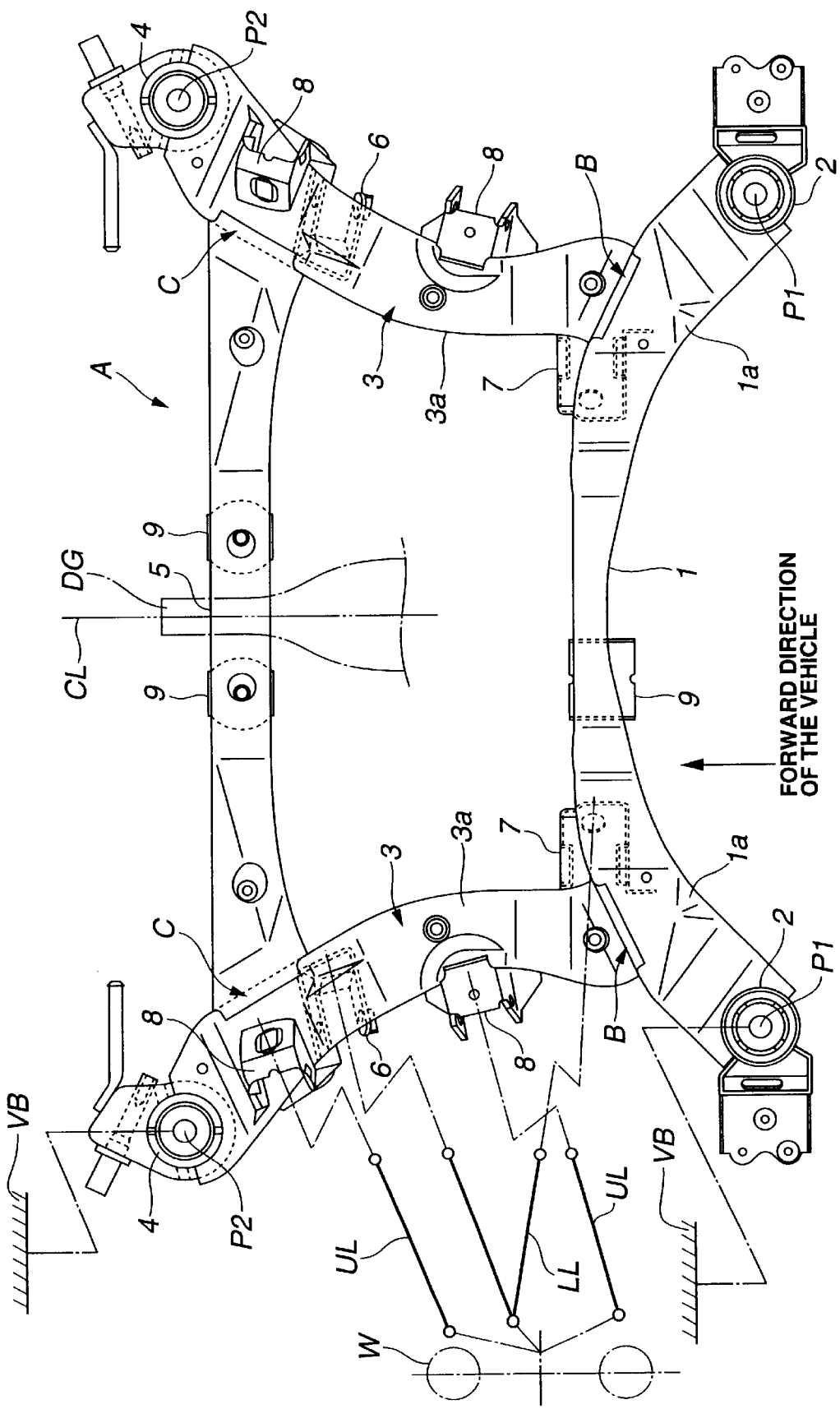
FIG. 1 is a plan view of a vehicle suspension member assembly according to an embodiment of the present invention.

Referring first to FIG. 1, a vehicle suspension member assembly according to an embodiment of the present invention is generally indicated by A and includes a rear cross member 1 elongated laterally of a vehicle body VB. The rear cross member 1 has opposite longitudinal end portions 1a and 1a which are bent rearward of the vehicle body VB and therefore has a nearly arcuated shape. The rear cross member 1 has at the opposite longitudinal ends thereof resilient mountings or supports 2.

The rear cross member 1 has on the front surface thereof connecting surface portions (connecting portions B) which are located symmetrically about the longitudinal center line CL of the vehicle body VB, for connecting thereto side members 3. To the connecting surface portions of the cross member 1 are welded the rear ends of the side members 3, respectively. To the front end of each side member 3 is attached a resilient mounting or support 4.

The above described cross member 5 is disposed between front portions of the side members 3. The opposite longitudinal ends of the front cross member 5 are welded to the inner surfaces of the side members 3, respectively.

The suspension member assembly A is resiliently supported on the vehicle body VB by way of the resilient supports 2 provided to the cross member 1 and the resilient supports 4 provided to the front ends of the side members 3.

Further, a front lower link connecting bracket 6 for connecting thereto a front portion of each lower link LL is attached to the front lower surface portion of each side member 3 (adjacent the connecting portion of the front cross member 5), and a rear lower link connecting bracket (lower link connecting point) 7 for connecting thereto a rear portion of each lower link LL is attached to the lower surface of the rear cross member 1.

Each side member 3 has at a location intermediate between opposite longitudinal ends thereof a bent portion 3a which is bent upwardly. To the upper surface of each bent portion 3a are attached a pair of upper link connecting brackets 8 and 8 for connecting thereto upper links UL, respectively.

Further, a differential gear DG is supported on the rear cross member 1 by way of resilient bushings 9. The front resilient bushings 9 are attached so that its axis extends vertically, and the rear resilient bushing 9 is attached so that its axis extends longitudinally of the vehicle body VB.

In order to cope with a variation of the tread, a modified suspension member assembly can be manufactured based on the above described assembly A by allowing the resilient support points P2 to move laterally outward of the vehicle body VB while holding the rear resilient support points P1 unchanged. When this is the case, only the front and rear cross members 5 and 1, i.e., two parts need to be replaced by modified parts but the side members 3 can be used in common, i.e., the side members 3 can be used without making any modification thereof.

With the suspension member assembly A according to the present invention, the positions of the rear resilient support points P1 are determined wholly under the influence of the rear cross member 1, and the side members 3 do not have any influence upon the positions of the resilient support points P1, so the positions of the side members 3 can be changed freely laterally of the vehicle body VB in accordance with the modified front resilient support points P2, and it will do to use the front cross member 5 and the rear cross member 1 which are modified so as to be capable of connecting between the side members 3 disposed at the modified positions.

Figure 2:
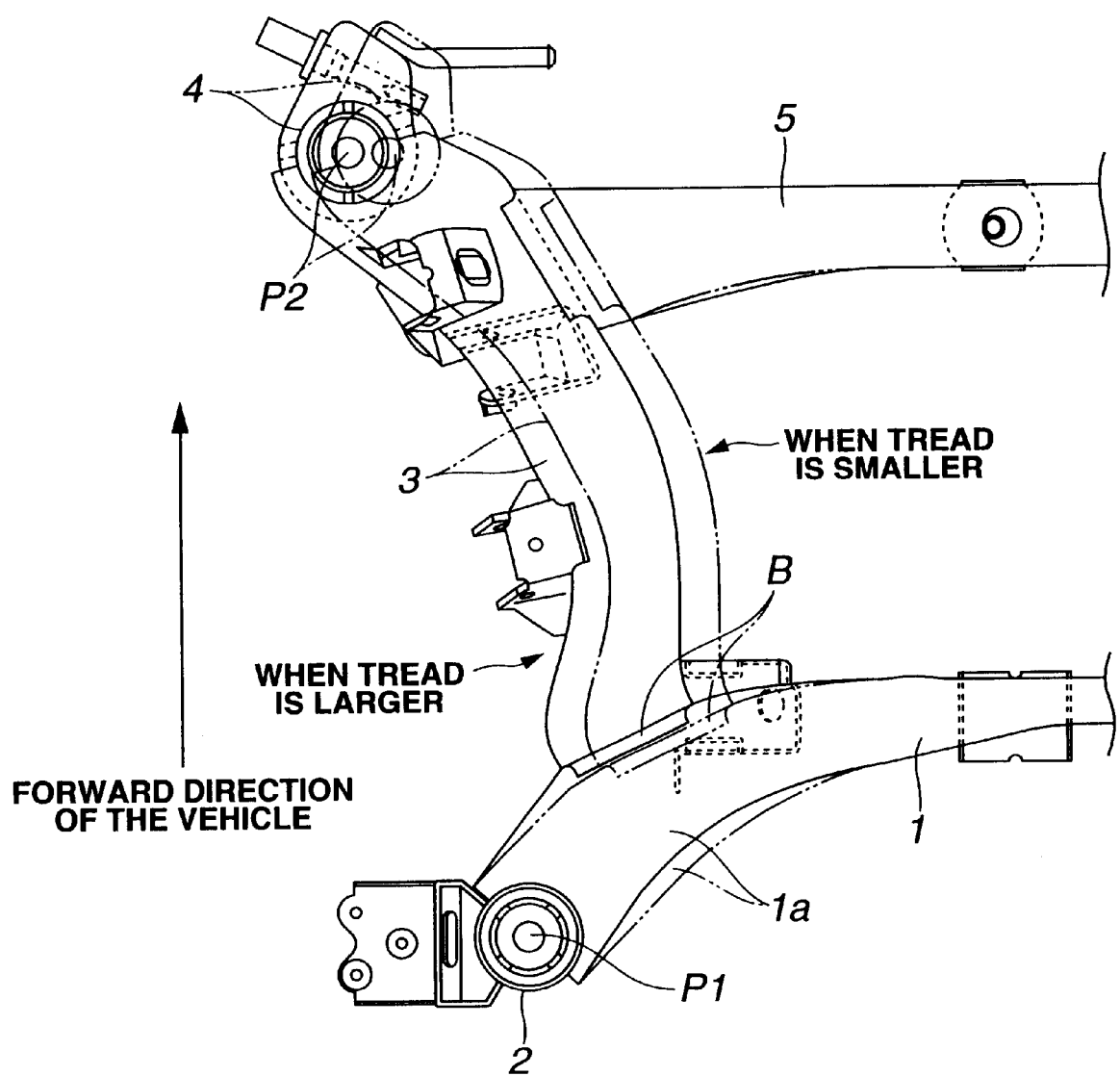
FIG. 2 is a fragmentary plan view of the suspension member assembly of FIG. 1 for illustrating its adaptation or modification to cope with a variation of a tread.

In this connection, in case the rear resilient support points P1 are not changed as described above, the same (i.e., unmodified) cross member 1 can be used so that, as shown in FIG. 2, adaptation of the suspension member assembly A to the above described variation of the tread can be attained by adjusting the bending of the opposite bent portions 1a and 1a and thereby moving the side member 3 connecting surface portions (the connecting portions or joints B between the side members 3 and the cross member 1) laterally of the vehicle body VB.

For adjustment of the positions of the side member 3 connecting surface portions (connecting portions B) by the above described bending, it is recommendable to use a pipe material which can be bent easily, as a material for forming the rear cross member 1.

When the front resilient support points P2 are moved laterally outward of the vehicle body VB while holding the side member 3 connecting surface portions of the rear cross member 1 unchanged, not only the link connecting angles (i.e., the angles of inclination of the links connected to the side members 3 when observed in a plan view) are changed but the positional difference in the lateral direction of the vehicle body VB between each side member 3 connecting surface portion of the rear cross member 1 and each front resilient support point P2 becomes larger, this being disadvantageous from the point of view of the strength and rigidity at the connecting portion B between the side member 3 and the rear cross member 1.

Further, while the suspension member assembly A receives a lateral force from the lower link LL, a large shearing force is not supplied to the connecting portion or joints C between the front cross member 5 and the side member 3 since there is arranged adjacent the front lower link connecting point the connecting portion C where the opposite longitudinal ends of the front cross member 5 are connected to the inner sides of the side members 3.

Figure 4:
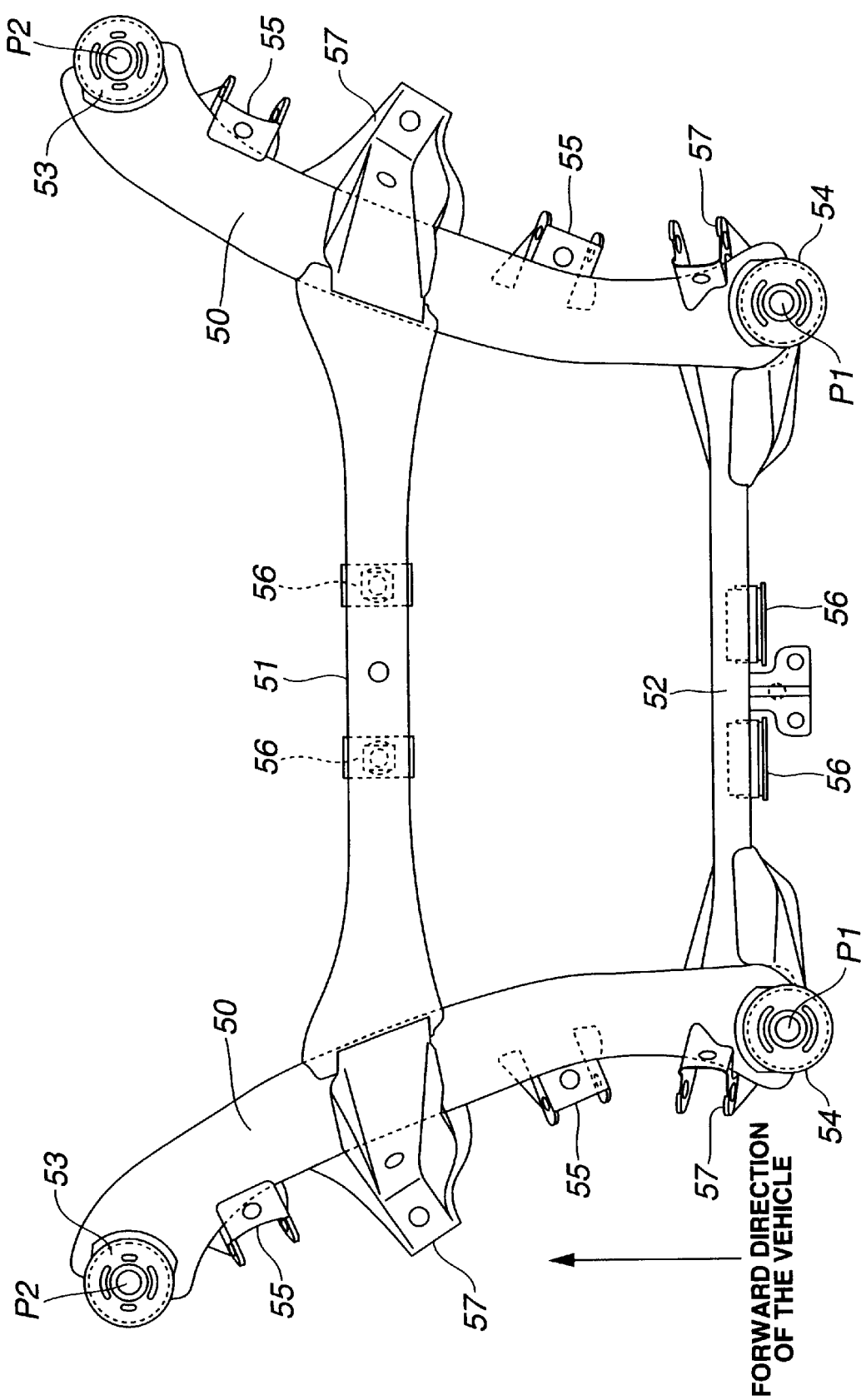
FIG. 4 is a plan view of a vehicle suspension member assembly which has a problem to be solved by the present invention.

Further, if the rear lower link connecting points are arranged at the side members 3 as shown in FIG. 4, a large shearing force is supplied to the connecting portions B between the rear cross member 1 and the side members 3 due to a force supplied thereto from the lower link LL. However, since, in this embodiment, the bracket 7 constituting the rear lower link connecting point is disposed on the rear cross member 1 which is resiliently supported on the vehicle body member, it becomes possible to prevent a large shearing force from being supplied to the connecting portions B between the rear cross member 1 and the side members 3 upon input of a force from the lower link LL.

Further, the suspension member assembly A receives a force (i.e., so-called windup input) from the differential gear DG. However, since, in this embodiment, the rear cross member 1 supporting the rear portion of the differential gear DG is directly supported on the vehicle body VB, it becomes possible to prevent a large shearing force from being caused at the connecting portion B between the side member 3 and the rear cross member 1 due to the windup input as is caused in the comparative example shown in FIG. 4 and therefore it becomes unnecessary to take some countermeasure for retaining a predetermined strength and rigidity at the connecting portion B between the side member 3 and the rear cross member 1.

Further, in this embodiment, the rear cross member 1 is formed into a nearly arcuated shape in a way as to have its intermediate portion between the opposite ends to protrude forward of the vehicle body VB, as mentioned above. By this, as compared with the case wherein the rear cross member 1 is formed into a straight shape elongated laterally of the vehicle body VB, the rear cross member 1 and therefore the suspension member assembly A as a whole can have a larger strength and rigidity. Simultaneously with this, as mentioned above, by controlling the shape and degree of bending while using the same piece of metal to be processed by bending, the side member 3 connecting surface portions of the rear cross member 1 can be changed easily and readily in accordance with a variation of the tread.

However, in case the positions of the rear resilient supports 2 are also to be changed, it will do to form the rear cross member 1 from a different piece of metal. Even in this case, the left and right side members 3 can be used in common, i.e., can be used without making any modification thereof.

In this connection, it is considered such a suspension member assembly wherein left and right side members are disposed so as to extend between the front and rear cross members and be connected at the front and rear ends thereof to same. In this instance, the resilient supports are disposed at the opposite longitudinal ends of the front and rear cross members, respectively. When this is the case, in order to change or modify the front resilient support points, while holding the rear resilient support points fixed or unchanged, in order to cope with a variation or modification of the tread, all of the four constituent parts need be changed and therefore common use of them cannot be attained. Furthermore, in case, similarly to the prior art, all of the lower link connecting points are disposed at the side members, the suspension member assembly is disadvantageous from the point of view of the strength and rigidity of each connecting portion between each cross member and each side member, with respect to a lateral force from a lower link.

Figure 3:
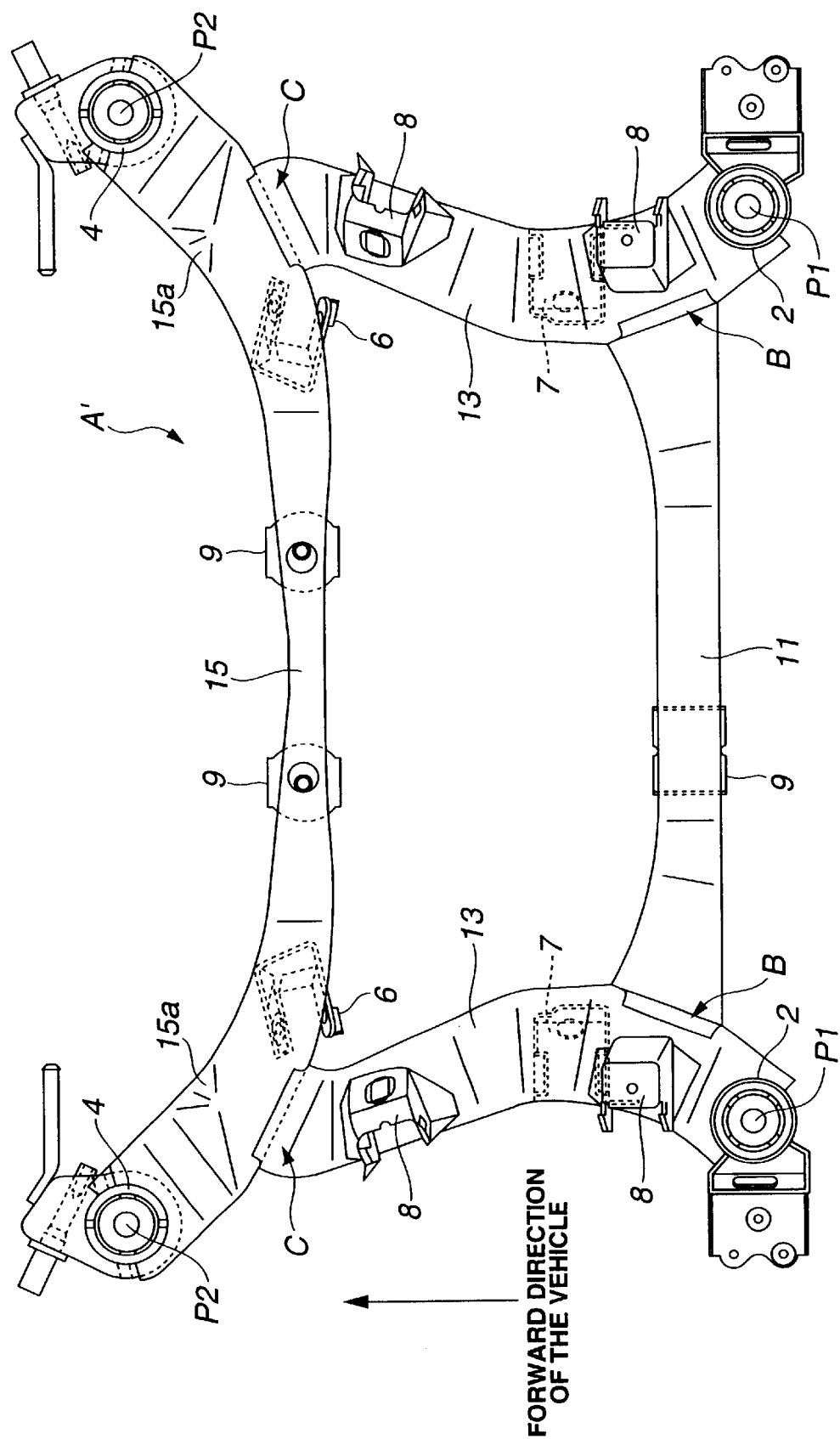
FIG. 3 is a view similar to FIG. 1 but shows another embodiment.

Referring to FIG. 3, another embodiment of the present invention will be described. In FIG. 3, like parts and portions to those of FIGS. 1 and 2 are designated by like reference characters.

The suspension member assembly A' of this embodiment is constructed such that the front cross member 15 and rear cross member 11 are shaped and arranged inversely as compared with the embodiment of FIG. 1.

The front cross member 15 is generally elongated laterally of the vehicle body VB. The front cross member 15 has opposite longitudinal end portions 15a which are bent forward of the vehicle and has a nearly arcuated shape. To the opposite end portions 15a are attached resilient mountings or supports 4, respectively.

At the positions on the rear surface of the front cross member 15 which are symmetrical about the longitudinal center line CL of the vehicle body VB (refer to FIG. 1), there are formed side member 13 connecting surface portions to which the front ends of the side members 13 are connected, respectively. Each side member 13 is elongated generally longitudinally of the vehicle body VB to have a rear end portion to which is provided a resilient mounting or support 2.

Between the rear portions of the side members 13 there is disposed the rear cross member 11 which are welded at the opposite longitudinal ends thereof to the inner surfaces of the side members 13, respectively.

By the resilient mountings 4 provided to the front cross member 15 and the resilient mountings 2 provided to the rear end portions of the side members 13, the suspension member assembly A' is installed on the vehicle body VB (refer to FIG. 1).

Further, rear lower link connecting brackets (rear lower link connecting points) 7 are provided to the rear portions of the side members 13 (i.e., the portions adjacent the connecting portions B between the rear cross member 11 and the side members 13), and front lower link connecting brackets (front lower link connecting points) 6 are provided to the front cross member 15.

Each side member 13 has an intermediate portion between the opposite longitudinal ends which are bent or curved upward. To the bent portions of each side member 13 are provided front and rear brackets 8 for connecting thereto upper links UL (refer to FIG. 1), respectively.

Further, the differential gear DG (refer to FIG. 1) is resiliently supported on the rear cross member 11 and the front cross member 15 by means of the resilient bushings 9.

With the above described suspension member assembly A', the positions of the front resilient support points P2 are determined by the front cross member 15, and the side members 13 do not have any direct influence upon the rear resilient support points P2. Thus, the positions of the side members 13 can be varied or modified freely laterally of the vehicle body VB in accordance with the modified rear resilient support points P1 in order to adapt the suspension member assembly A' to a variation or modification of the tread, and the rear cross member 11 and the front cross member 15 which are modified so as to be capable connecting between the side members 13 at the modified positions, are used.

In this connection, in case the positions of the front resilient support points P2 are not changed, the same piece of metal is used for forming the front cross member 15, and the shape of bending of the opposite end portions 15a and 15a is controlled so as to move the side member 13 connecting surface portions laterally of the vehicle body, whereby it becomes possible to adapt the suspension member assembly A' to a variation or modification of the tread. In case the positions of the side member 13 connecting surface portions are controlled by controlling the bending of the front cross member 15, it is desirable to use a pipe material for forming the front cross member 15.

Further, upon input of a lateral force from the lower link, application of a large shearing force to the connecting portion B between the cross member 1 and the side member 13 is prevented since at the rear lower link connecting point there is provided the rear cross member 11 which is elongated in the widthwise direction of the vehicle so as to be connected at the opposite ends thereof to the inner sides of the side members 13.

Further, in case the front lower link connecting points are disposed at the side members 13 as in the comparable arrangement shown in FIG. 4, an input of force from the lower link causes a large shearing force to be supplied to the connecting portion C between the front cross member 15 and the side member 13. However, in this embodiment, the front lower link connecting brackets 6 are installed on the front cross member 15 which is resiliently supported on the vehicle body VB, so by the suspension member assembly A' of this embodiment an input of force from the lower link LL does not cause a large shearing force to be supplied to the connecting portion C between the front cross member 15 and the side member 13.

Further, the suspension member assembly A' receives a so-called windup input from the differential gear DG. However, since in this embodiment the front cross member 15 supporting the front side of the differential gear DG is directly supported on the vehicle body VB, it becomes possible to prevent a large shearing force from being caused at the connecting portion C between the side member 13 and the front cross member 15 by the above described windup input, and therefore the connecting portion C between the side member 13 and the front cross member 15 is structured so as to be desirable from the point of view of the strength and rigidity.

This embodiment can produce substantially the same effect as the embodiment described with respect to FIGS. 1 and 2.

The entire contents of Japanese Patent Application P11-165929 is incorporated herein by reference.

Although the invention has been described above by reference to certain embodiments of the invention, the invention is not limited to the embodiments described above. Modifications and variations of the embodiments described above will occur in light of the above teachings. The scope of the invention is defined with reference to the following claims.

What is claimed is:

1. An adjustable vehicle suspension member assembly comprising:

a pair of front and rear cross members spaced from each other longitudinally of a vehicle body and elongated laterally of the vehicle body;

a pair of side members spaced from each other laterally of the vehicle body and elongated longitudinally of the vehicle body;

said side members and said front and rear cross members being joined to constitute a generally rectangular suspension member subassembly and pivotally supporting suspension links disposed between vehicle wheels and the vehicle body;

a pair of front resilient supports for supporting a front portion of said subassembly on the vehicle body; and a pair of rear resilient supports for supporting a rear portion of said subassembly on the vehicle body, wherein said rear resilient supports are disposed at opposite longitudinal end portions of said rear cross member, respectively, and said front resilient supports are disposed at front end portions of said side members, respectively, wherein said front cross member is disposed between said side members, and said side members are connected at rear ends thereof to a front side of said rear cross member, and wherein said rectangular suspension member subassembly is adjustable by moving the pair of front resilient supports laterally relative to the vehicle body and thereby only replacing the front and rear cross members.

2. The suspension member assembly according to claim 1, wherein said rear cross member has a pair of lower link connecting points, each for connecting thereto a lower link.

3. The suspension member assembly according to claim 1, wherein said front and rear cross members have resilient support means for supporting thereon a differential gear resiliently.

4. The suspension member assembly according to claim 1, wherein said side members are connected at rear ends thereof to said rear cross member in such a manner as to allow said opposite longitudinal end portions of said rear cross member to protrude from the joints between said rear cross member and said respective rear ends of said side members, laterally outward of the vehicle body.

5. The suspension member assembly according to claim 4, wherein said front cross member is connected at opposite longitudinal ends thereof to said side members in such a manner as to allow said front end portions of said side members to protrude from the joints between said front cross member and said respective side members, forwardly of the vehicle body.

6. The suspension member assembly according to claim 5, wherein said rear cross member is arcuated in a way as to allow said opposite longitudinal end portions thereof to protrude rearwardly of the vehicle body.

7. In an adjustable vehicle suspension member assembly comprising:

a pair of front and rear cross members spaced from each other longitudinally of a vehicle body and elongated laterally of the vehicle body, a pair of side members spaced from each other laterally of the vehicle body and elongated longitudinally of the vehicle body, the side members and the front and rear cross members being joined to constitute a generally rectangular suspension member subassembly, a pair of front resilient supports for supporting a front portion of the subassembly on the vehicle body, and a pair of rear resilient supports for supporting a rear portion of the subassembly on the vehicle body, wherein said rear resilient supports are disposed at opposite longitudinal end portions of said rear cross member, respectively, and said front resilient supports are disposed at front end portions of said side members, respectively, wherein said front cross member is disposed between said side members, wherein said side members are connected at rear ends thereof to a front side of said rear cross member, and wherein said rectangular suspension member subassembly is adjustable by moving the pair of front resilient supports laterally relative to the vehicle body and thereby only replacing the front and rear cross members.

8. A multi-link type rear adjustable vehicle suspension system comprising:

a suspension member assembly including a pair of front and rear cross members spaced from each other longitudinally of a vehicle body and elongated laterally of the vehicle body, a pair of side members spaced from each other laterally of the vehicle body and elongated longitudinally of the vehicle body, said side members and said front and rear cross members being joined to constitute a generally rectangular suspension member subassembly, said front cross member being disposed between said side members, said side members being connected at rear ends thereof to a front side of said rear cross member, a pair of front resilient supports disposed at front end portions of said side members for supporting a front portion of said subassembly on the vehicle body, and a pair of rear resilient supports disposed at opposite longitudinal end portions of said rear cross member for supporting a rear portion of said subassembly on the vehicle body; and a pair of lower links disposed between the vehicle body and respective vehicle wheels, wherein each of said lower links having a rear connecting point connected to said rear cross member, and wherein said rectangular suspension member subassembly is adjustable by moving the pair of front resilient supports laterally relative to the vehicle body and thereby only replacing the front and rear cross members.

9. The rear suspension system according to claim 8, wherein each of said lower links further comprises a front connecting point connected to each of said side members at a location adjacent the connecting portion between each of said side members and said front cross member.

10. The rear suspension system according to claim 8, wherein said side members are connected at rear ends thereof to said rear cross member in such a manner as to allow said opposite longitudinal end portions of said rear cross member to protrude from the joints between said rear cross member and said respective rear ends of said side members, laterally outward of the vehicle body.

11. The rear suspension system according to claim 10, wherein said front cross member is connected at opposite longitudinal ends thereof to said side members in such a manner as to allow said front end portions of said side members to protrude from the joints between said front cross member and said respective side members, forwardly of the vehicle body.

12. The rear suspension system according to claim 11, wherein said rear cross member is arcuated in a way as to allow said opposite longitudinal end portions thereof to protrude rearwardly of the vehicle body.

* * * * *